Aug. 4, 1964   J. LE BRIS ETAL   3,143,483
METHODS OF EXTRACTING URANIUM FROM ORES CONTAINING IT
Filed June 12, 1956   2 Sheets-Sheet 1

United States Patent Office 3,143,483
Patented Aug. 4, 1964

3,143,483
METHODS OF EXTRACTING URANIUM FROM ORES CONTAINING IT
Jean Le Bris, Paris, Pierre Mouret, Bourg-la-Reine, and Paul Pottier, Fontenay-aux-Roses, France, assignors to Commissariat a l'Energie Atomique, Paris, France, a society of France
Filed June 12, 1956, Ser. No. 590,864
Claims priority, application France June 20, 1955
4 Claims. (Cl. 204—1.5)

The present invention relates to methods for the extraction of uranium from ores that contain it.

There are known methods of extracting uranium which consist, after having formed, by means of the ore, a clear solution (that is to say a solution free from insoluble residues) of sodium carbonate containing uranium in the form of a uranyl-sodium carbonate complex, in modifying the pH of the solution to a value such that said complex ceases to be stable, uranium then precipitating in the state of sodium uranate which is separated by filtration.

These methods are little advantageous from the industrial point of view and even cannot be applied when the ore to be treated contains too low a percentage of uranium, that is to say less than 1 gram of uranium per liter of the above mentioned solution. One of the main drawbacks of such methods is that the reagents used for attacking the ore are destroyed during the treatment and cannot be recovered to be used for a new treatment of a fresh amount of ore.

Outside of these methods it has ben proposed, in order to precipitate uranium from carbonate solutions such as above mentioned, which contain uranium in the hexavalent state, to treat the solution, heated at a suitable temperature, by a gas under pressure containing molecular hydrogen in the presence of a hydrogenating catalyst, which causes a precipitation of uranium in the tetravalent state. The drawback of such a method lies in the necessity of working under pressure and in the hot state.

The object of the present invention is to avoid the drawbacks, such as those above mentioned, of the known methods of extracting uranium from its ores, and in particular from ores containing but a low percentage of uranium.

For this purpose, according to our invention, after having prepared a clear solution of a neutral or acid carbonate of at least one body belonging to the group constituted by alkali metals and ammonium, said solution containing uranium in the hexavalent state, we produce in this solution a disengagement of nascent hydrogen which causes the quantitative precipitation of tetravalent hydrated uranium oxide, which is subsequently separated from the solution and treated in any suitable manner for extracting uranium therefrom.

The disengagement of nascent hydrogen is obtained by electrolysis of the solution, in the presence of a hydrogenation catalyst such as nickel, platinum, palladium, iron, mercury, or finely divided alloys of these metals, for instance aluminium and nickel.

The clear solution which is subjected to the electrolytic action may be obtained in any suitable manner. For instance we may, in the known fashion, obtain such a solution of sodium carbonate by proceeding:

Either by attack of the ore by an acid solution (in an oxidizing medium in the case of an ore containing tetravalent uranium, acid possibly playing the part of the oxidizing agent), separation of the insoluble residue by filtration or decantation, treatment of the clear solution thus obtained by an excess of sodium carbonate, separation of the precipitate of foreign metals in the form of carbonates or hydroxides, the clear solution that remains containing the uranyl-sodium carbonate complex;

Or again by direct attack of the ore by a solution of carbonate or acid carbonate of sodium (in an oxidizing medium when the ore contains tetravalent uranium).

The clear solution of neutral or acid carbonate, containing uranium in the hexavalent state, is subjected to electrolysis in an apparatus of any suitable type.

The catalyst, which is chosen among the above mentioned metals and alloys, is advantageously present in the form of a suspension in the solution to be subjected to electrolysis. In this case, at the end of the operation, the catalyst is separated from the precipitate of hydrated tetravalent uranium oxide by any known physical method. For instance, if the catalyst consists of Raney nickel, use is advantageously made of the magnetic properties of nickel to perform this separation.

However, instead of using the catalyst in the state of a powder, we may make use of a fine grid, for instance of nickel, advantageously located in close proximity to the cathode.

It should be noted that the method according to our invention gives very good results while operating under atmospheric pressure and without heating (the rise of temperature that takes place resulting solely from the Joule effect due to the passage of electric current between the electrodes).

Once the hydrated tetravalent uranium oxide precipitate has been separated by filtration from the solution, said solution can be reutilized to attack a fresh amount of ore (in the case where use is made of a direct carbonate attack of the ore). The method according to the invention therefore permits recycling of the attacking carbonate solution. Furthermore it makes it possible to work in continuous fashion.

We will now describe practical embodiments and examples of the invention, with reference to the appended drawings given merely by way of example and in which.

Figure 1:
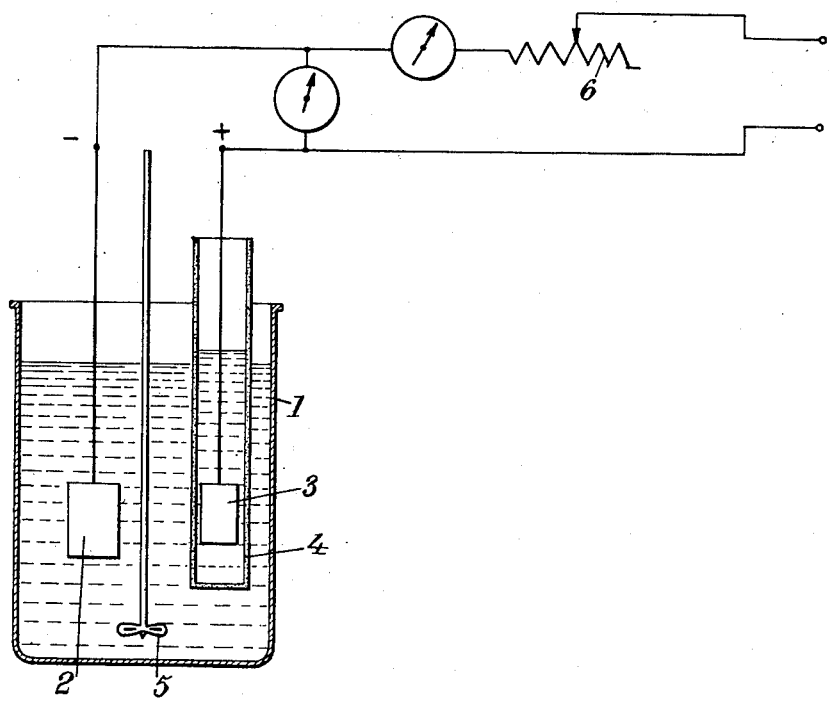
FIG. 1 is a diagrammatical view of an electrolysis apparatus for carrying out the method according to the invention.
Figure 2:
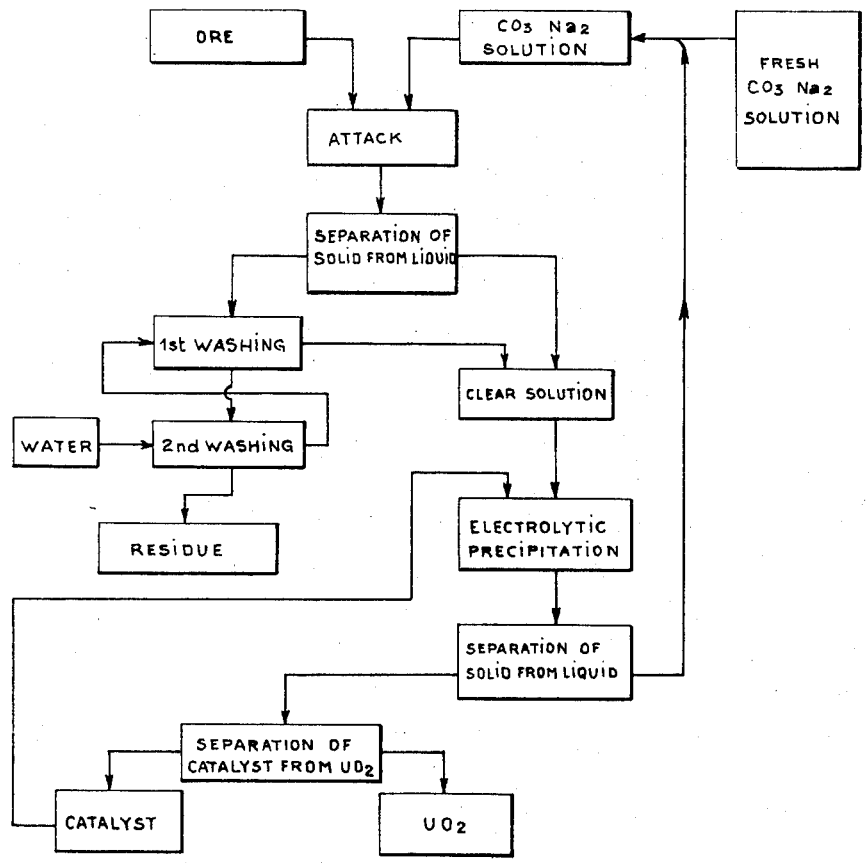
FIG. 2 is a flow-sheet of an example of the method according to our invention.

The apparatus of FIG. 1 includes the following elements:

A container 1, for instance of glass;

Two electrodes 2 and 3 constituted by perforated platinum plates, connected to a current source S, for instance of 24 volts (with the interposition of a rheostat 6), the positive electrode 3 being surrounded by a diaphragm constituted by a small container (for instance of a volume equal to a about 1/10 of the volume of container 1) made of a silico-aluminous material of low ohmic resistance;

A stirring device 5.

Having thus diagrammatically described an apparatus which may be used for carrying out our invention, we will now describe in a detailed fashion three examples of such a method.

Example I

The ore to be treated is a silico-granitic ore of the Limousin region in France, containing 0.3% of uranium. The mineralogic species containing uranium and such an ore are: billietite, alpha uranotile and gummite.

This ore is crushed to 40 mesh (that is to say into a powder passing through a 40 mesh sieve).

An aqueous solution of sodium carbonate of 7.5% concentration, that is to say containing 0.075 kg. of carbonate per liter, is prepared.

In a vessel of a total capacity of 4 liters containing 2 liters of the above mentioned solution, at a temperature of 70° C., we slowly introduce, while stirring, 1 kg. of the ore crushed as above stated. The attack is pursued for 4 hours, while stirring and maintaining the temperature at 70° C.

We filtrate to separate the clear solution from the solid residues and these residues are washed. The clear solution thus separated is mixed with the washing waters, the whole having then a volume of 3 liters.

Measurements made on a sample of the solid residue showed that it contains only 0.006% of uranium, that is to say, since one kilogram of ore has been treated, 0.00006 kg. As the ore contains 0.3% of uranium, the kilogram that has been treated contained 0.003 kg. of uranium. The 3 liters of clear solution obtained therefore contain 0.003 kg.−0.00006 kg.=0.00294 kg. of uranium, which corresponds to a yield of the attack equal to 98%.

On the other hand, these 3 liters of final solution have been obtained from two liters of an initial solution containing 0.075 kg. of sodium carbonate per liter.

Therefore, 1 liter of the final solution contains, per liter:

$$\frac{0.00294 \text{ kg.}}{3}=0.00098 \text{ kg., i.e. } 980 \text{ milligrams of uranium;}$$

$$\frac{2 \cdot 0.075 \text{ kg.}}{3}=0.050 \text{ kg., i.e. } 50 \text{ grams of sodium carbonate}$$

In an apparatus such as above described with reference to FIG. 1 and such that the capacity of vessel 1 is 0.8 liter, we pour into the cathodic compartment 0.5 liter of the final solution obtained as above indicated. We pour into the anodic compartment (that is to say into the diaphragm 4) a 5% aqueous solution of sodium carbonate. We add into the cathodic compartment 2.5 gr. of Raney nickel.

The stirring device 5 is started. The electric electrolysis circuit is closed. Rheostat 6 is adjusted to give in the electrolyte a current density of 0.5 ampere per sq. cm. and a potential difference across the terminals of 6.5 volts.

No heating means are used (due to the Joule effect, there is a rise of the temperature during electrolysis). The vessel 1 is under atmospheric pressure.

The following table gives the values, after different times of electrolysis, of the concentration (in milligrams per liter) of uranium remaining in the solution subjected to electrolysis and of the percentage of precipitation of uranium.

| Time | Temperature, degrees | Concentration of uranium remaining in the solution (mg./liter) | Percentage of precipitation of uranium |
|---|---|---|---|
|  | 21 | 890 | 0 |
| 10 min | 21 | 980 | 0 |
| 20 min | 28 | 980 | 0 |
| 30 min | 32 | 710 | 27.5 |
| 40 min | 32 | 395 | 59.5 |
| 50 min | 38 | 195 | 80 |
| 1 hr | 40 | 37 | 96.2 |
| 1 h. 15 | 40 | 15 | 98.5 |
| 1 h. 30 | 40 | 1.6 | 99.8 |

It will therefore be seen that, after an electrolytic treatment of one hour and a half, the total yield, equal to the yield of the attack of the ore multiplied by the yield of the electrolytic treatment is: $^{98}/_{100} \cdot ^{99.8}/_{100} = ^{97.8}/_{100}$, i.e., 97.8%.

Example II

The ore that is treated is from the Grury region (Saône & Loire), France, that is to say a siliceous ore containing 0.0249% of uranium, the uraniferous mineralogic species of which are autunite and chalcolite.

The treatment is similar to that of the first example, with the following differences:

The attack of 1 kg. of ore is performed by means of 1 liter of an aqueous solution at 10% of sodium carbonate at a temperature of 80° C., for 5 hours.

The clear solution obtained after attack has a volume of 2 liters.

The yield of the attack is 80.3%. The clear solution contains 100 milligrams of uranium per liter.

The results of the electrolytic treatment are given by the following table:

| Time, min. | Concentration of uranium remaining in the solution (mg./liter) | Percentage of precipitation of uranium |
|---|---|---|
| 0 | 100 | 0 |
| 15 | 79 | 21 |
| 30 | 35.5 | 64.5 |
| 45 | 23.7 | 76.3 |
| 60 | 18.2 | 81.8 |
| 75 | 15 | 85 |

Therefore after electrolysis for one hour and a quarter, the total yield is $$\frac{80.3}{100} \cdot \frac{85}{100}=68.2\%$$

Example III

We form a clear solution by direct attack of a third ore by sodium carbonate, and 300 cubic centimeters of this solution, of a uranium concentration equal to 143 milligrams per liter and of a sodium carbonate concentration of 5 grams per liter, are subjected to the electrolytic treatment, as above. The catalyst that is used consists of 5 grams of nickel. After an electrolytic treatment of one hour and a half, we obtained a precipitation yield very close to 100%, no detectable amount of uranium being found to exist in the solution (which means that there is less than 0.05 milligram of uranium per liter of solution).

The catalyst was recycled for electrolysis of solutions identical to the preceding one. Four successive recyclings always led to a yield of 100%.

What we claim is:

1. A method of precipitating uranium from aqueous solutions of a carbonate of a member of the group consisting of the alkali metals and ammonium containing the uranium in the hexavalent state, which method comprises incorporating a hydrogenation catalyst in the solution in the form of particles in suspension therein, subjecting the whole to electrolysis while stirring, to disengage nascent hydrogen conveyed through the mass of said solution by said catalyst, and removing the precipitated tetravalent uranium oxide from the solution.

2. A method according to claim 1 in which said catalyst consists at least mainly of nickel.

3. A method according to claim 1 in which said carbonate is sodium carbonate.

4. A method according to claim 2 in which said carbonate is sodium carbonate.

References Cited in the file of this patent

UNITED STATES PATENTS

| | | |
|---|---|---|
| 1,577,411 | Thews | Mar. 16, 1926 |
| 1,945,611 | Knight et al. | Feb. 6, 1934 |
| 2,581,863 | Kahn | Jan. 8, 1952 |
| 2,727,806 | Forward et al. | Dec. 10, 1955 |
| 2,739,934 | Kunin | Mar. 27, 1956 |
| 2,743,222 | Clevenger | Apr. 24, 1956 |
| 2,807,519 | Polissar | Sept. 24, 1957 |
| 2,832,728 | Kunin | Apr. 29, 1958 |

FOREIGN PATENTS

| | | |
|---|---|---|
| 517,199 | Canada | Oct. 4, 1955 |

OTHER REFERENCES

Friend: "Textbook of Inorganic Chemistry," vol. VII, Part III, pp. 300–304 (1926), published by Charles Griffin and Co. Ltd., London.

ACCO–25: "A Regenerative Electrolytic Process for Recovering Uranium from Ore," Aug. 29, 1952 (11 pages).

ACCO–29: "The Application of the Electrolytic Uranium Recovery Process to Limestone Ore from Grants, New Mexico," Sept. 1, 1953 (22 pages).